US010793010B2

(12) United States Patent
Jung et al.

(10) Patent No.: US 10,793,010 B2
(45) Date of Patent: Oct. 6, 2020

(54) CONTROL METHOD AND CONTROL SYSTEM FOR MOTOR-DRIVEN VEHICLE

(71) Applicants: Hyundai Motor Company, Seoul (KR); Kia Motors Corporation, Seoul (KR)

(72) Inventors: Jae Won Jung, Seoul (KR); Kang Sik Jeon, Gyeonggi-Do (KR); Seung Yoon Lee, Seoul (KR); Sung Ho Yang, Gyeonggi-do (KR); Jae Young Shim, Gyeonggi-do (KR); Min Gon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 252 days.

(21) Appl. No.: 15/976,298

(22) Filed: May 10, 2018

(65) Prior Publication Data
US 2019/0160966 A1 May 30, 2019

(30) Foreign Application Priority Data

Nov. 24, 2017 (KR) .................... 10-2017-0158939

(51) Int. Cl.
*B60L 3/10* (2006.01)
*B60L 15/20* (2006.01)
*B60K 31/02* (2006.01)

(52) U.S. Cl.
CPC .......... *B60L 15/2036* (2013.01); *B60K 31/02* (2013.01); *B60L 3/106* (2013.01);
(Continued)

(58) Field of Classification Search
CPC ...... B60L 15/2036; B60L 3/106; B60L 15/20; B60L 15/2072; B60L 2240/421;
(Continued)

(56) References Cited

U.S. PATENT DOCUMENTS 5,341,298 A * 8/1994 Singleton ............... B60K 28/16
180/197
5,961,559 A * 10/1999 Shimbara ............... B60L 7/006
701/23

(Continued)

FOREIGN PATENT DOCUMENTS

KR 10-0290412 B1 3/2001

*Primary Examiner* — Richard A Goldman
(74) *Attorney, Agent, or Firm* — Mintz Levin Cohn Ferris Glovsky and Popeo, P.C.; Peter F. Corless

(57) ABSTRACT

A control method for a motor-driven vehicle is provided. The method includes calculating a correction torque of a drive motor through a difference between speeds of wheels or a variance rate of the difference between speeds of the wheels and comparing a calculated correction torque with a current required torque of the drive motor. When the calculated correction torque is greater than the current required torque, the drive motor is operated based on the current required torque. When the calculated correction torque is less than or equal to the current required torque, the drive motor is operated based on the calculated correction torque, or the required torque of the drive motor is corrected to correspond to the calculated correction torque and the drive motor is operated based on a corrected required torque of the drive motor.

11 Claims, 4 Drawing Sheets

(52) U.S. Cl.
CPC ........... *B60L 15/20* (2013.01); *B60L 15/2072* (2013.01); *B60L 2240/421* (2013.01); *B60L 2240/423* (2013.01); *B60L 2240/461* (2013.01); *B60L 2250/26* (2013.01); *B60Y 2200/11* (2013.01); *B60Y 2300/60* (2013.01); *B60Y 2400/3032* (2013.01); *B60Y 2400/60* (2013.01)

(58) Field of Classification Search
CPC ......... B60L 2240/423; B60L 2240/461; B60L 2250/26; B60K 31/02; B60Y 2200/11; B60Y 23/60; B60Y 2400/3032; B60Y 2400/60; B60W 2710/083; B60W 30/18; B60W 30/18172; B60W 2720/26; B60W 2720/263; B60W 2720/266; B60W 2720/28; B60W 2720/30; B60W 2720/40
USPC ..................................... 701/22, 69; 180/197
See application file for complete search history.

(56) References Cited

U.S. PATENT DOCUMENTS

| | | | | |
|---|---|---|---|---|
| 6,442,454 | B1* | 8/2002 | Akiba | B60K 6/52 701/22 |
| 8,892,315 | B2* | 11/2014 | Field | B60W 10/06 180/65.21 |
| 2002/0167156 | A1* | 11/2002 | Akutagawa | B60L 3/10 280/757 |
| 2005/0065705 | A1* | 3/2005 | Hartmann | F02D 13/0226 701/102 |
| 2005/0150702 | A1* | 7/2005 | Matsuzaki | B60K 6/52 180/197 |
| 2006/0219454 | A1* | 10/2006 | Itoh | B60W 10/04 180/197 |
| 2008/0190680 | A1* | 8/2008 | Kaneko | B60W 10/08 180/170 |
| 2009/0210108 | A1* | 8/2009 | Okubo | B60K 6/445 701/22 |
| 2012/0203406 | A1* | 8/2012 | Akebono | B60W 10/08 701/22 |
| 2013/0304294 | A1* | 11/2013 | Hosoe | B60W 10/06 701/22 |
| 2016/0107634 | A1* | 4/2016 | Kim | B60W 10/26 701/22 |
| 2017/0008505 | A1* | 1/2017 | Park | B60W 20/10 |
| 2017/0057361 | A1* | 3/2017 | Cho | B60T 8/176 |
| 2017/0349163 | A1* | 12/2017 | Kim | B60L 58/13 |
| 2019/0160966 | A1* | 5/2019 | Jung | B60L 15/2072 |
| 2019/0193568 | A1* | 6/2019 | Cho | B60L 3/102 |
| 2019/0193781 | A1* | 6/2019 | Jang | B62D 6/005 |
| 2019/0232799 | A1* | 8/2019 | Hirata | B60L 9/18 |
| 2019/0344796 | A1* | 11/2019 | Lian | B60K 17/356 |
| 2019/0366855 | A1* | 12/2019 | Oh | B60L 15/20 |

* cited by examiner

CONTROL METHOD AND CONTROL SYSTEM FOR MOTOR-DRIVEN VEHICLE

CROSS REFERENCE TO RELATED APPLICATION

The present application claims priority to Korean Patent Application No. 10-2017-0158939, filed Nov. 24, 2017, the entire contents of which is incorporated herein for all purposes by this reference.

BACKGROUND

1. Field of the Invention

The present invention relates to a control method and a control system for a motor-driven vehicle and, more particularly, to a technology for limiting a drive torque to prevent wheel slip of a vehicle.

2. Description of the Prior Art

A motor-driven vehicle includes a traction control system (TCS), which is a type of safety system that automatically controls a brake, a motor torque, and the like when starting the vehicle or accelerating on a snowy road, an icy road, or an uneven road to prevent a wheel from spinning with no traction, and also improves steering stability. When a phenomenon occurs, in which an excess driving force is generated when a vehicle starts or accelerates on a slippery road and thus a tire of the vehicle slips, torque reduction control is executed. In an operation of the TCS, the TCS transmits a required TCS torque for torque reduction to an upper controller, and the upper controller reduces a motor torque to rapidly respond in the torque reduction.

Further, a fuel cell vehicle is driven by an electric motor like in an electric vehicle. In an electric motor-driven vehicle, the electric motor-driven vehicle is capable of generating a full torque even in a stopped state. Therefore, when the electric motor-driven vehicle accelerates in a low friction road state, the wheel slip may occur excessively compared to a general engine vehicle. In general, the brake adjustment and drive torque adjustment are performed to reduce the wheel slip. The TCS may independently perform the brake adjustment, but in the drive torque adjustment, the TCS generates a request to a fuel cell vehicle controller (FCU) for torque limitation. The torque limitation is a request transmitted to the FCU, which determines a torque command of a drive motor, for limitation to prevent a drive torque command from exceeding a torque limitation value. However, since an output response of an electric motor is rapid, excessive wheel slip occurs before the TCS recognizes the wheel slip and then applies sufficient torque adjustment during acceleration. Therefore, for the stability of driving on a low friction road, a wheel needs to rapidly return to a direction of reducing the wheel slip.

The foregoing description of the background art is merely for the purpose of promoting understanding of the background of the present invention and should not be construed as an admission that the description is a prior art which is already known to a person skilled in the art.

SUMMARY

The present invention provides a control method and a control system for reducing the occurrence of wheel slip by limiting a torque in advance before TCS control of a motor-driven vehicle.

In accordance with the above aspect, a control method for a motor-driven vehicle according to the present invention may include: calculating a correction torque of a drive motor through a difference between speeds of a plurality of wheels or a variance rate of the difference between speeds of the plurality of wheels; comparing a calculated correction torque with a current required torque of the drive motor; when the calculated correction torque is greater than the current required torque of the drive motor, operating the drive motor based on the current required torque of the drive motor; and when the calculated correction torque is less than or equal to the current required torque of the drive motor, operating the drive motor based on the calculated correction torque, or correcting the required torque of the drive motor to match the required torque of the drive motor to the calculated correction torque and operating the drive motor based on a corrected required torque of the drive motor.

The method may further include determining whether a TCS operates before calculating the correction torque, and the correction torque may be calculated when the TCS does not operate. The method may further include determining whether a correction torque is required to be calculated based on the difference between speeds of the plurality of wheels before calculating the correction torque, and the correction torque may be calculated when the difference between speeds of the plurality of wheels has a value greater than or equal to a predetermined difference value.

In the calculation of the correction torque, the largest value among difference values between speeds of the wheels may be determined as the difference between speeds of the wheels. In addition, a variance rate of a difference between speeds of a plurality of wheels may be calculated using an amount of variance between a currently calculated difference between speeds of the wheels and a lastly calculated difference between speeds of the wheels. The correction torque may be calculated by subtracting, from the current required torque, a control value obtained using an error between a calculated difference in speeds of the wheels and a target difference in speeds of the wheels, or an error between a variance rate of the calculated difference in speeds of the wheels and a target variance rate of the difference in speeds of the wheels.

In the calculation of the correction torque, the correction torque may be calculated through reduction in a proportion that corresponds to a control value obtained through a proportional integral (PI) control of the error between the calculated difference in speeds of the wheels and the target difference in speeds of the wheels, or the error between the variance rate of the calculated difference in speeds of the wheels and the target variance rate of the difference in speeds of the wheels. The calculation of the correction torque may further include comparing the calculated correction torque with a TCS correction torque, and a smaller value between the calculated correction torque and the TCS correction torque may be calculated as a correction torque. When the calculated correction torque is less than or equal to the current required torque of the drive motor, the drive motor may be operated to generate a torque determined based on the correction torque or a corrected required torque of the drive motor.

In accordance with the above aspect, a control system for a motor-driven vehicle according to the present invention may include: a speed measurement unit configured to measure wheel speeds of a plurality of wheels; a motor controller configured to operate a drive motor; and a drive controller configured to calculate a correction torque of the drive motor through a difference between speeds of the plurality of wheels or a variance rate of the difference between speeds of the plurality of wheels, operate the motor controller to operate the drive motor based on a current required torque of the drive motor when a calculated correction torque is greater than the current required torque of the drive motor, and operate the motor controller to operate the drive motor based on the calculated correction torque when the calculated correction torque is less than or equal to the current required torque of the drive motor, or correct the required torque of the drive motor to match the required torque of the drive motor to the calculated correction torque, and operate the motor controller to operate the drive motor based on a corrected required torque of the drive motor.

The control system may further include an electronic stability control (ESC) controller configured to calculate a TSC correction torque, and the drive controller may be configured to calculate a smaller value between the calculated correction torque and a TCS correction torque as a correction torque. The drive controller may further be configured to calculate the correction torque through reduction in a proportion corresponding to a control value obtained through a PI control of an error between a calculated difference in speeds of a plurality of wheels and a target difference in speeds of the wheels, or an error between a variance rate of the calculated difference in speeds of the wheels and a target variance rate of the difference in speeds of the wheels. A control method and a control system for a motor-driven vehicle of the present invention have an effect of preventing vehicle wheel slip beyond that of installing a chain on a drive wheel of the vehicle. In addition, the present invention may prevent vehicle wheel slip in advance before an operation of a TCS, thereby improving a wheel slip rate at the initial stage of oscillation.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
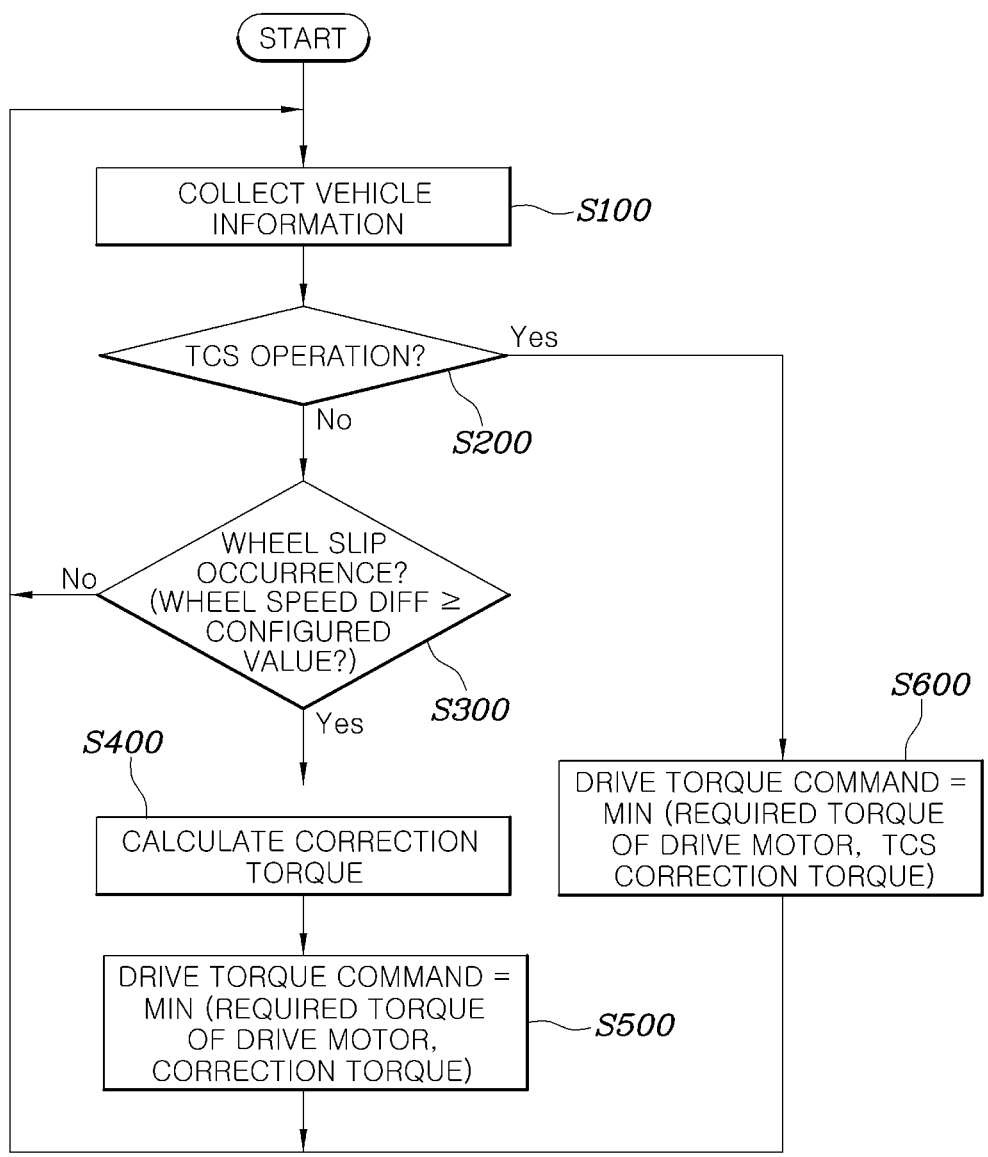
FIG. 1 is a flow chart of a control method for a motor-driven vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural or functional descriptions of exemplary embodiments of the present invention disclosed in the specification or application are given merely for the purpose of describing the embodiment according to the present invention. Therefore, the exemplary embodiments according to the present invention may be implemented in various forms, and the present invention should not be construed as being limited to the exemplary embodiments described in the specification or application.

Various changes and modifications may be made to the exemplary embodiments according to the present invention, and therefore particular exemplary embodiments will be illustrated in the drawings and described in the specification or application. However, it should be understood that exemplary embodiments according to the concept of the present invention are not limited to the particular disclosed exemplary embodiments, but the present invention includes all modifications, equivalents, and alternatives falling within the spirit and scope of the present invention.

Although the terms such as first, second and the like may be used to describe various elements, the elements should not be defined by the terms. The terms are merely used to distinguish one element from another element, and thus a first element may be named a second element while the second element may be similarly named the first element, without departing from the scope of protection according to the concept of the present invention.

In the case where an element is referred to as being "connected to" or "accessed by" other elements, it should be understood that the element may not only be directly connected to or accessed by the other elements, but another element may also exist between them. Meanwhile, in the case where a component is referral to as being "directly connected to" or "directly accessed by" another component, it should be understood that there is no component therebetween. The other expressions of describing a relation between structural elements, i.e. "between" and "merely between" or "neighboring" and "directly neighboring", should be interpreted similarly to the above description.

In the present specification, the terms are merely used to describe a specific exemplary embodiment, and are not intended to limit the present invention. As used herein, the singular forms are intended to include the plural forms as well, unless the context clearly indicates otherwise. In the description, it should be understood that the terms "include" or "have" indicate the existence of a feature, a number, a step, an operation, a structural element, parts, or a combination thereof, and do not previously exclude the existence or the probability of addition of one or more other features, numerals, steps, operations, structural elements, parts, or combinations thereof.

Unless defined differently, all terms used herein, which include technical terminologies or scientific terminologies, have the same meaning as that generally understood by a person skilled in the art to which the present invention belongs. It should be interpreted that the terms, which are identical to those defined in general dictionaries, have the meaning identical to that in the context of the related technique. The terms should not be ideally or excessively interpreted as having a formal meaning unless clearly defined otherwise.

Hereinafter, an exemplary embodiment of the present invention will be described in detail with reference to the accompanying drawings. The same reference numerals presented in the drawings denote the same elements.

FIG. 1 is a flow chart of a control method for a motor-driven vehicle according to an exemplary embodiment of the present invention. Referring to FIG. 1, a control method for a motor-driven vehicle according to an exemplary embodiment of the present invention may include calculating a correction torque of a drive motor through a difference between speeds of a plurality of wheels or a variance rate of the difference between speeds of the plurality of wheels (S400), wherein the speeds are detected using a sensor mounted within the vehicle; comparing a calculated correction torque with a current required torque of the drive motor; when the calculated correction torque is greater than the current required torque of the drive motor, operating the drive motor based on the current required torque of the drive motor (S500); and when the calculated correction torque is less than or equal to the current required torque of the drive motor, operating the drive motor based on the calculated correction torque, or correcting the required torque of the drive motor to match the required torque of the drive motor to the calculated correction torque and operating the drive motor based on a corrected required torque of the drive motor (not shown).

In particular, speeds of a plurality of wheels may be measured by collecting vehicle information (S100). The speeds of the plurality of wheels may be wheel speeds measured in the plurality of wheels, respectively, or may be wheel speeds converted using a rotational speed (RPM) of the drive motor. In a case of a general vehicle having four wheels, wheel speeds of a right front wheel (FR), a left front wheel (FL), a right rear wheel (RR), and a left rear wheel (RL) may be measured, respectively using a sensor mounted thereto.

A difference between speeds of a plurality of wheels may refer to a difference between speeds of a plurality of predetermined wheels. Specifically, the difference between speeds of the plurality of wheels may refer to a difference between the left front wheel speed and the left rear wheel speed, a difference between the right front wheel speed and the right rear wheel speed, or a difference between speeds of wheels disposed diagonally to each other. The difference between speeds of the wheels may refer to a difference between a wheel speed converted using a rotational speed (RPM) of the drive motor and one of the wheel speeds or an average value of the wheel speeds.

The largest value among difference values between speeds of the wheels may be determined as the difference between speeds of the wheels. A plurality of values may be obtained for the difference between speeds of a plurality of wheels, and the largest value among the obtained values may be determined as the difference between speeds of a plurality of wheels. Accordingly, the wheel slip may be detected more accurately. A variance rate of a difference between speeds of a plurality of wheels may be obtained using a change between a currently calculated difference between speeds of the wheels and a lastly calculated difference between speeds of the wheels (e.g., the difference is calculated at different points in time). In other words, the variance rate of the difference between speeds of the wheels may be calculated as an amount of variance of the difference between speeds of the wheels, which is changed based on a predetermined calculation period, and may be calculated as an hourly variance rate in a difference between speeds of the wheels, obtained by dividing the amount of variance by the calculation period.

According to an exemplary embodiment, the control method may further include determining whether a TCS operates (S200) before calculating the correction torque (S400), and the correction torque may be calculated when the TCS does not operate. When the TCS operates, a drive torque command may be calculated as a smaller value between a required torque of a drive torque and a TCS correction torque (S600). In other words, a correction torque may be calculated only before the TCS operates, to operate the drive motor, using the correction torque, and after the TCS starts to operate, the control of the present invention may be stopped to correct a torque of the drive motor by the TCS.

According to another exemplary embodiment, a correction torque may be calculated regardless of whether a TCS operates. In particular, the control method may further include comparing a calculated correction torque with a TCS correction torque (not shown) before calculating the correction torque (S400), and a smaller value between the calculated correction torque and the TCS correction torque may be calculated as a correction torque. In other words, a correction torque may be calculated regardless of whether the TCS operates, and the correction torque may be compared with the TCS correction torque to calculate a smaller value (e.g., a correction torque that limits a torque more) obtained from the comparison as a correction torque to thus adjust a torque of a drive motor to be maximally limited.

The contents of an operation of the TCS and a correction torque according thereto are described in detail in prior art documents and are obvious to a person skilled in the art. Therefore, a detailed description thereof will be omitted. The control method may further include determining whether a correction torque is required to be calculated based on a difference between speeds of a plurality of wheels (S300) before calculating the correction torque (S400), and the correction torque may be calculated when the difference between speeds of the wheels has a value greater than or equal to a predetermined difference value. The controller may be configured to determine that wheel slip occurs when a calculated difference between speeds of the wheels has a value greater than or equal to the predetermined difference value, and thus it may be determined that it is necessary to limit a torque of a drive motor. Therefore, a correction torque may be calculated to control limitation of the torque of the drive motor.

Figure 2:
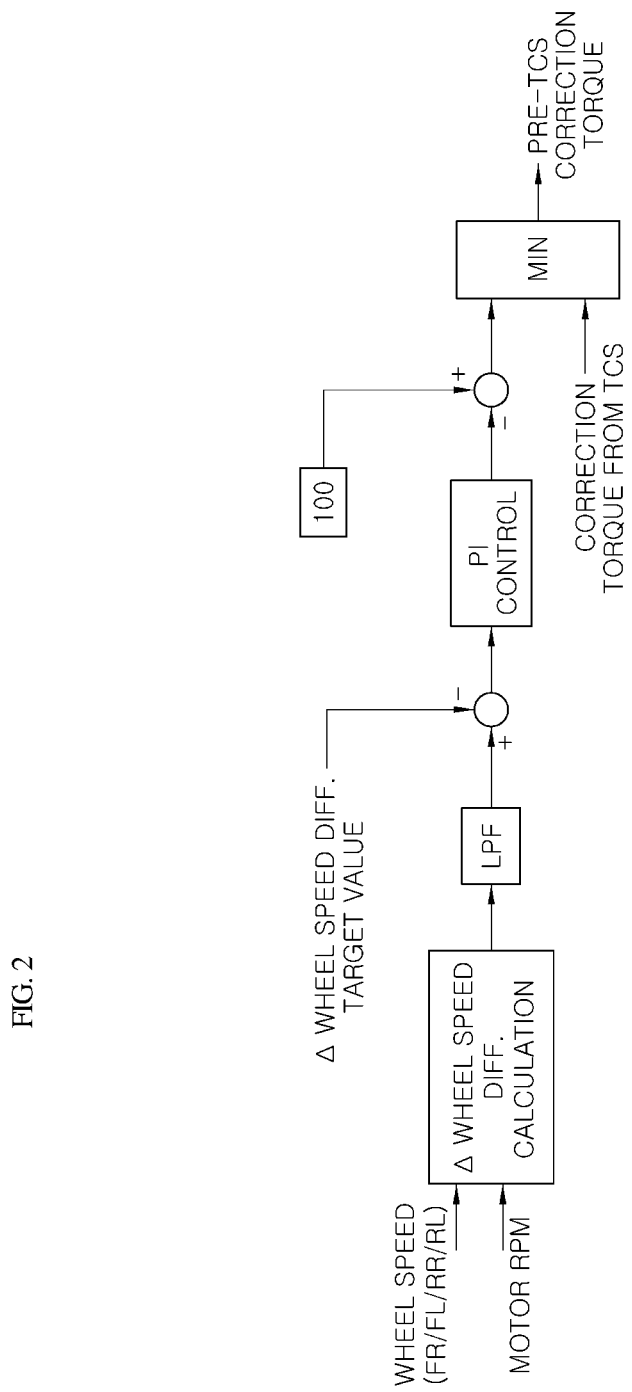
FIG. 2 illustrates a procedure for calculating a correction torque according to an exemplary embodiment of the present invention.

FIG. 2 illustrates a procedure for calculating a correction torque according to an exemplary embodiment of the present invention. Referring to FIG. 2, in the calculating of a correction torque (Pre-TCS correction torque) (S400), the correction torque may be calculated by subtracting, from a current required torque, a control value obtained using an error between a calculated difference in speeds of a plurality of wheels and a target difference in speeds of the wheels, or an error between a variance rate of the calculated difference in speeds of the wheels and a target variance rate of the difference in speeds of the wheels.

Particularly, in the calculating of the correction torque (S400), the correction torque may be calculated through reduction in a proportion that corresponds to a control value obtained through a PI control of the error between the calculated difference in speeds of the wheels and the target difference in speeds of the wheels, or the error between the variance rate of the calculated difference in speeds of the wheels and the target variance rate of the difference in speeds of the wheels. Herein, only a method for calculating a correction torque using a variance rate of a difference between speeds of a plurality of wheels is described. A method for calculating a correction torque by using a difference between speeds of a plurality of wheels may be applied in the same manner.

Furthermore, the filtering may be applied to a variance rate of a calculated difference between speeds of a plurality of wheels ($\Delta$ wheel speed Diff.). Since a frequency is low, a Low Pass Filter (LPF) configured to filter a high frequency may be applied. The variance rate of the calculated difference between speeds of the wheels ($\Delta$ wheel speed Diff.) may be filtered, and then an error between the variance rate of the calculated difference between speeds of the wheels and a variance rate of a target difference between speeds of the wheels ($\Delta$ wheel speed Diff. target value) may be calculated. The target variance rate of the difference between speeds of the wheels ($\Delta$ wheel speed Diff. target value) may be 0 or a constant close to 0. Therefore, when wheel slip occurs, the difference between speeds of a plurality of wheels increases, and thus, the variance rate of the calculated difference between speeds of the wheels ($\Delta$ wheel speed Diff.) may be a positive number. By subtracting the target variance rate of the difference between speeds of the wheels ($\Delta$ wheel speed Diff. target value) from the positive variance rate of the calculated difference, a positive error value may be obtained.

The calculated positive error value may be controlled through PI control. In particular, through the PI control, the variance rate of the difference between speeds of the wheels ($\Delta$ wheel speed Diff.) may be filtered, and then an error between the filtered variance rate and the target variance rate of the difference between speeds of the wheels ($\Delta$ wheel speed Diff. target value) may be reduced. The residual error may be reduced by accumulating the error though the integral control, so that the variance rate of the difference between speeds of the wheels ($\Delta$ wheel speed Diff.) may converge to the target variance rate of the difference between speeds of the wheels ($\Delta$ wheel speed Diff. target value).

In addition, to increase a response speed, a differential control (D control) may be further included. Various control methods, such as a proportional derivation (PD) control, a PID control, and the like, may be used. A correction torque may be calculated through reduction in a proportion that corresponds to a control value obtained through a PI control of an error between a variance rate of a calculated difference in speeds of a plurality of wheels and a variance rate of a target difference in speeds of the wheels. Specifically, a correction torque may be calculated through reduction in a proportion that corresponds to a control value obtained through a PI control from a torque required by a driver. For example, when the control value calculated through the PI control is 30, 70 [%] of the torque required by the driver may be calculated as a correction torque by applying 70 [%], which is obtained by subtracting 30 [%] from 100 [%]. The torque required by the driver may be determined by a control value input from an accelerator pedal sensor (APS) or the like. Otherwise, the torque may be a torque corrected by an upper controller by receiving a control value input by the driver.

Moreover, the calculation of the correction torque (S400) may further include comparing a calculated correction torque with a TCS correction torque, and a smaller value between the calculated correction torque and the TCS correction torque may be calculated as a correction torque. As shown in FIG. 2, a smaller value between the calculated correction torque and the TCS correction torque (e.g., a correction torque from a TCS) may be calculated as a correction torque (e.g., a Pre-TCS correction torque).

Referring again to FIG. 2, in comparing a calculated correction torque with a current required torque of a drive motor (S500), the magnitude of the calculated correction torque may be compared with the magnitude of the current required torque of the drive motor. When wheel slip occurs, the drive motor may be required to be driven using a smaller torque between the calculated correction torque and the current required torque of the drive motor due to a situation where a torque is required to be reduced in magnitude. Particularly, in adjusting a current required torque of a drive motor by using a calculated correction torque (not shown), when the calculated correction torque is less than or equal to a current required torque of the drive motor, the drive motor may be operated to generate a torque determined based on the correction torque or a corrected required torque of the drive motor.

When the calculated correction torque is less than or equal to the current required torque of the drive motor, the drive motor may be operated to generate a torque equivalent to the correction torque. Accordingly, the drive motor may be operated to generate a torque based on the correction torque, or the required torque of the drive motor may be adjusted to correspond to the correction torque. When the required torque of the drive motor is adjusted to match the correction torque, a torque value for operating the drive motor does not change rapidly, and gradually reaches the correction torque to operate the drive motor, which may be advantageous in terms of operability and stability. When the drive motor is operated to generate a torque based on the correction torque, it may be disadvantageous in terms of operability such as rattling and the like and vehicle commerciality. However, it may be advantageous in terms of immediacy and stability since the torque may be reduced rapidly. The drive motor may be operated to generate a corresponding torque under a command of the correction torque or a required torque that is adjusted to correspond to the correction torque.

Figure 3:
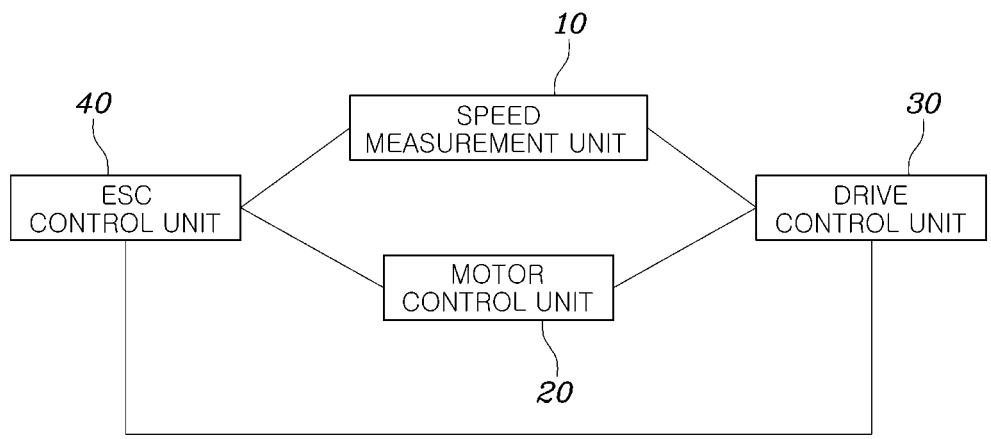
FIG. 3 illustrates a configuration of a control system for a motor-driven vehicle according to an exemplary embodiment of the present invention.

FIG. 3 illustrates a configuration of a control system for a motor-driven vehicle according to an exemplary embodiment of the present invention. Referring to FIG. 3, a control system for a motor-driven vehicle according to an exemplary embodiment of the present invention may include: a speed measurement unit 10 (e.g., a sensor unit) configured to measure wheel speeds of a plurality of wheels; a motor controller 20 configured to operate a drive motor; and a drive controller 30 configured to calculate a correction torque of the drive motor through a difference between speeds of the plurality of wheels or a variance rate of the difference between speeds of the plurality of wheels, operate the motor controller to operate the drive motor based on a current required torque of the drive motor when a calculated correction torque is greater than the current required torque of the drive motor, and operate the motor controller to operate the drive motor based on the calculated correction torque when the calculated correction torque is less than or equal to the current required torque of the drive motor, or correct the required torque of the drive motor so that the required torque of the drive motor corresponds to the calculated correction torque, and operate the motor controller to operate the drive motor based on a corrected required torque of the drive motor.

The speed measurement unit 10 may be connected to a plurality of sensors configured to measure a wheel speed, and may be connected to a sensor configured to measure a rotational speed of an output shaft of the drive motor. The motor controller 20 may be a motor control unit (MCU). The drive motor may be operated by a rotational speed of a motor or a command value of a torque. The control system may further include an electronic stability control (ESC) controller 40 configured to calculate a TSC correction torque, and the drive controller 30 may be configured to calculate, as a correction torque, a smaller value between the calculated correction torque and a TCS correction torque calculated by the ESC controller 40.

Further, the drive controller 30 of the control system for a motor-driven vehicle of the present invention may be included in a fuel cell controller (FCU) in a case of a fuel cell electric vehicle (FCEV), or may be configured as an ECU or a separate controller. The ESC controller 40 configured to adjust vehicle stability is generally known and thus the detailed description thereof will be omitted. The drive controller 30 may be configured to calculate a correction torque through reduction in a proportion that corresponds to a control value obtained through a PI control of an error between a calculated difference in speeds of a plurality of wheels and a target difference in speeds of the wheels, or an error between a variance rate of the calculated difference in speeds of the wheels and a target variance rate of the difference in speeds of the wheels.

Figure 4:
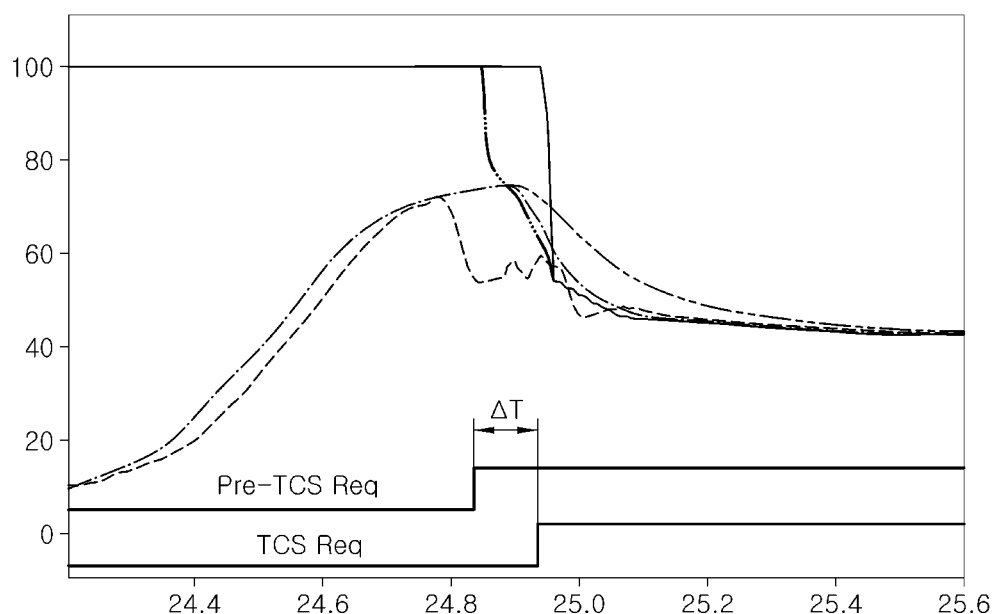
FIG. 4 illustrates a torque of a motor to which a control method for a motor-driven vehicle according to an exemplary embodiment of the present invention is applied.

The detailed description of the control system for a motor-driven vehicle will be omitted since the detailed description thereof is the same as the detailed description of the control method for a motor-driven vehicle. FIG. 4 illustrates a torque of a motor to which a control method for a motor-driven vehicle according to an exemplary embodiment of the present invention is applied.

Referring to FIG. 4, the correction torque calculation (Pre-TCS Req) according to the present invention may be controlled faster than the correction torque calculation (TCS Req) in a TCS. As shown in FIG. 4, it may be possible to respond more rapidly by AT and thus limit a torque in advance before a correction torque of the TCS. Therefore, a correction torque (FCU) starts to be limited faster than a correction torque (TCS), the correction torque (FCU) may be adjusted to correspond to a driver's required torque (e.g., a torque input by a driver) until the correction torque (FCU) reaches a motor torque command (FCU), and the motor torque command (FCU) may then be adjusted to correspond to the correction torque (FCU) from the time when the correction torque (FCU) falls below the motor torque command (FCU).

In other words, the existing motor torque command (FCU) may be limited based on the correction torque (TCS) which is limited later. However, unlike the existing motor torque command (FCU), a current motor torque command (FCU) may be limited based on the correction torque (FCU), and thus motor torque execution (MCU) may also be limited. Due to the limitation of the correction torque (TCS), when the correction torque (TCS) decreases to be less than the correction torque (FCU), the FCU may be adjusted so that the correction torque (FCU) corresponds to the correction torque (TCS) to perform the motor torque execution (MCU).

Figure 5:
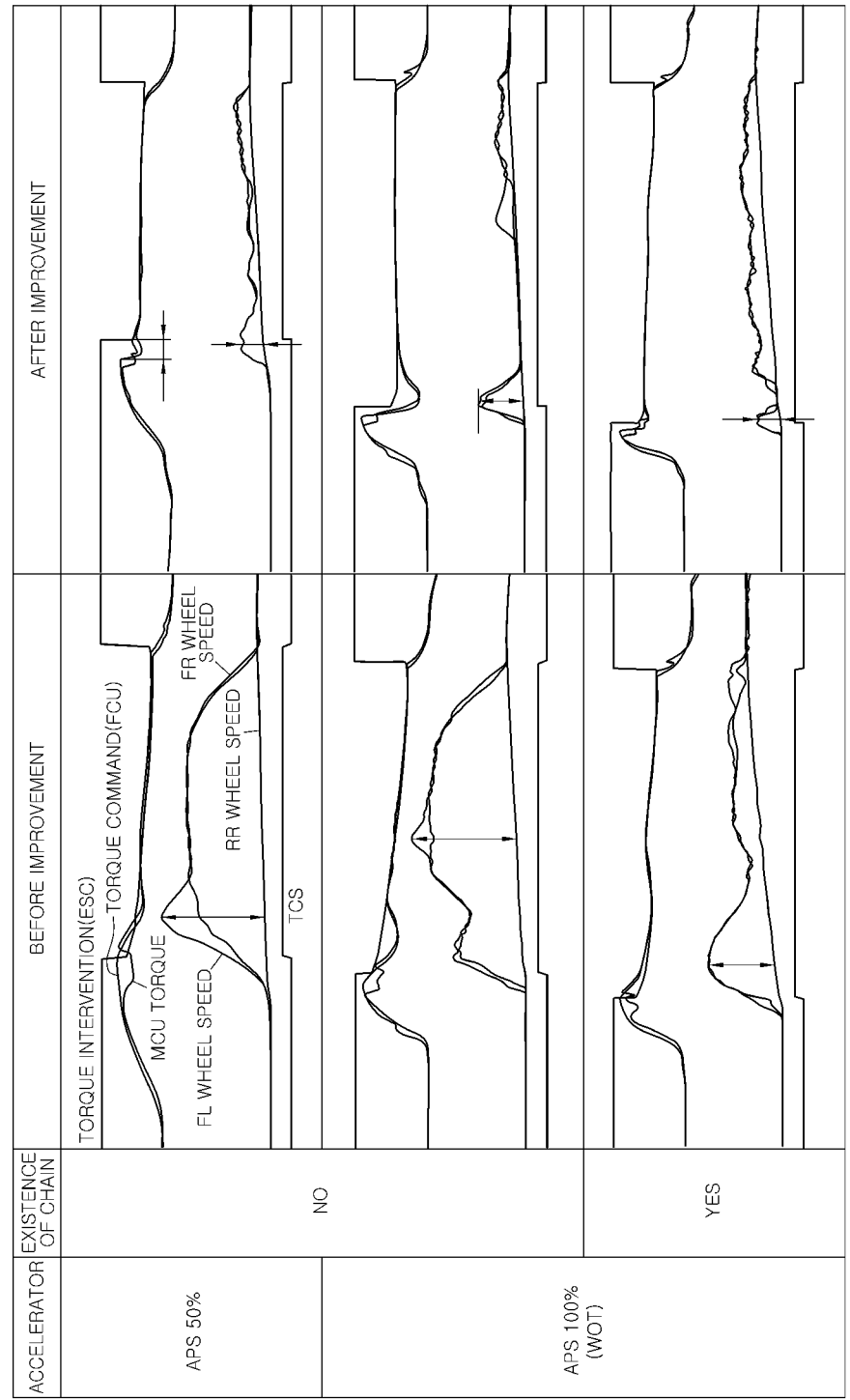
FIG. 5 illustrates torques before and after the application of an accelerator pedal sensor, a chain, and a control method for a motor-driven vehicle according to an exemplary embodiment of the present invention.

FIG. 5 illustrates a torque before and after the application of an accelerator pedal sensor, a chain, and a control method for a motor-driven vehicle according to an exemplary embodiment of the present invention. FIG. 5 shows an oscillation experiment performed in a situation where wheel slip occurs on a snowy flat mad. Notably, the initial wheel slip ratio at the time of the application of a correction torque of the present invention is improved by about 61 to 77%. In other words, the present invention has an effect of preventing, in advance, a FL wheel speed from diffusing at the beginning, and a greater effect of preventing wheel slip according to the present invention may be achieved than that by installing a chain on a front wheel.

Although the present invention has been shown and described with respect to the specific exemplary embodiments thereof, it will be apparent to a person skilled in the art that various modifications and variations may be made in the present invention without departing from the technical idea of the present invention, which is provided by the following claims.

What is claimed is:

1. A control method for a motor-driven vehicle, comprising:
   calculating, by a controller, a correction torque of a drive motor through a plurality of difference values between speeds of a plurality of wheels or a variance rate of the difference values between speeds of the plurality of wheels;
   comparing, by the controller, a calculated correction torque with a current required torque of the drive motor;
   operating, by the controller, the drive motor based on the current required torque of the drive motor when the calculated correction torque is greater than the current required torque of the drive motor;

operating, by the controller, the drive motor based on the calculated correction torque, or correcting the required torque of the drive motor to correspond to the calculated correction torque and operating the drive motor based on the corrected required torque of the drive motor when the calculated correction torque is less than or equal to the current required torque of the drive motor; and determining, by the controller, whether an operation of a traction control system (TCS) is performed before calculating the correction torque, wherein the correction torque is calculated when the operation of the TCS is not performed.

2. The control method of claim 1, further comprising before calculating the correction torque:

measuring the speeds of the wheels;

calculating the difference values between speeds of the wheels; and determining, by the controller, whether the correction torque is required to be calculated based on the difference values, wherein the correction torque is calculated when the difference values between speeds of the wheels have a value greater than or equal to a predetermined difference value.

3. The control method of claim 1, wherein, in calculating the correction torque, a largest value among the difference values between speeds of the wheels is determined as the difference between speeds of the wheels.

4. The control method of claim 1, wherein, in calculating the correction torque, the variance rate is obtained using an amount of variance between a currently calculated difference in speeds of the wheels and a previously calculated difference in speeds of the wheels.

5. The control method of claim 1, wherein, in calculating the correction torque, the correction torque is calculated by subtracting, from the current required torque, a control value obtained using an error between a calculated difference in speeds of the wheels and a target difference in speeds of the wheels, or an error between a variance rate of the calculated difference in speeds of the wheels and a target variance rate of the difference in speeds of the wheels.

6. The control method of claim 5, wherein, in calculating the correction torque, the correction torque is calculated through reduction in a proportion that corresponds to a control value obtained through a proportional-integral (PI) control of the error between the calculated difference in speeds of the wheels and the target difference in speeds of the wheels, or the error between the variance rate of the calculated difference in speeds of the wheels and the target variance rate of the difference in speeds of the wheels.

7. The control method of claim 1, wherein the calculating of the correction torque includes:

comparing, by the controller, the calculated correction torque with a traction control system (TCS) correction torque, and a smaller value of the calculated correction torque and the TCS correction torque is determined as the correction torque.

8. The control method of claim 1, wherein the operating of the drive motor by using the calculated correction torque includes:

operating, by the controller, the drive motor to generate a torque determined based on the correction torque or a corrected required torque of the drive motor, when the calculated correction torque is less than or equal to the current required torque of the drive motor.

9. A control system for a motor-driven vehicle, comprising:

a speed sensor configured to measure wheel speeds of a plurality of wheels;

a motor controller configured to operate a drive motor; and a drive controller configured to:

calculate a correction torque of the drive motor through a plurality of difference values between speeds of the plurality of wheels or a variance rate of the difference values between speeds of the plurality of wheels;

operate the motor controller to operate the drive motor based on a current required torque of the drive motor when a calculated correction torque is greater than the current required torque of the drive motor;

operate the motor controller to operate the drive motor based on the calculated correction torque when the calculated correction torque is less than or equal to the current required torque of the drive motor, or correct the required torque of the drive motor to correspond to the calculated correction torque, and operate the motor controller to operate the drive motor based on a corrected required torque of the drive motor; and determine whether an operation of a traction control system (TCS) is performed before calculating the correction torque, wherein the correction torque is calculated when the operation of the TCS is not performed.

10. The control system of claim 9, further comprising:

an electronic stability control (ESC) controller configured to calculate a traction control system (TCS) correction torque, wherein the drive controller is configured to determine a smaller value of the calculated correction torque and a TCS correction torque as the correction torque.

11. The control system of claim 9, wherein the drive controller is configured to calculate the correction torque through reduction in a proportion that corresponds to a control value obtained through a proportional-integral (PI) control of an error between a calculated difference in speeds of the plurality of wheels and a target difference in speeds of the wheels, or an error between a variance rate of the calculated difference in speeds of the wheels and a target variance rate of the difference in speeds of the wheels.

* * * * *